United States Patent [19]
Albe et al.

[11] Patent Number: 6,090,872
[45] Date of Patent: Jul. 18, 2000

[54] POLYMERIZATION PROCESS

[75] Inventors: Lisa Albe; Pamela Lawyer, both of Houston; Jay Nguyen, Pasadena; Mohan Gownder, Odessa, all of Tex.

[73] Assignee: Fina Technology, Inc., Dallas, Tex.

[21] Appl. No.: 09/166,360

[22] Filed: Oct. 5, 1998

[51] Int. Cl.$^7$ ...................................................... C08K 5/15
[52] U.S. Cl. ........................ 524/111; 525/333.7; 525/386
[58] Field of Search ......................... 524/111; 525/333.7, 525/386

[56] References Cited

U.S. PATENT DOCUMENTS

| | | | |
|---|---|---|---|
| 5,221,782 | 6/1993 | Aida et al. | 524/451 |
| 5,811,379 | 9/1998 | Rossi et al. | 508/591 |
| 5,866,659 | 2/1999 | Chung et al. | 525/279 |
| 6,015,862 | 1/2000 | Chung et al. | 525/320 |

*Primary Examiner*—Edward J. Cain
*Attorney, Agent, or Firm*—William D. Jackson; Jim Wheelington; M. Norwood Cheairs

[57] ABSTRACT

A process for the production and treatment of a stereoregular polypropylene, such as isotactic polypropylene in which a polymerization reactor is operated under conditions to react propylene supplied to the reactor to produce a stereoregular propylene polymer fluff. A product stream containing the fluff and unreacted propylene is withdrawn from the reactor and at least a portion of the unreacted propylene is separated from the product stream. The propylene polymer fluff is heated to a temperature sufficient to melt the propylene polymer, and a lactone is incorporated into the propylene polymer. The lactone is a 5,7 dialkyl-3-(2,3 dialkyl phenyl)-3H-benzofuran-2-one, in which the 5,7 and 2,3 substituents are of relatively low molecular weights. The phenyl alkyl substituents, each contain 1 or 2 carbon atoms, and the 5,7 alkyl substituents each contain from 2 to 5 carbon atoms. After the heating and incorporation of the lactone, the heated polymer fluff containing the lactone is extruded to produce particles of the propylene polymer. The polymer particles containing the lactone can be heated to a molten state and then extruded to form a fiber preform. The fiber preform is subject to spinning and drawing at differential spinning and drawing speeds to provide a draw ratio sufficient to form a continuous polypropylene fiber.

14 Claims, 2 Drawing Sheets

POLYMERIZATION PROCESS

FIELD OF THE INVENTION

This invention relates to a method for the treatment of stereoregular propylene polymers and more particularly to the treatment of isotactic propylene polymers involving the incorporation of lactones.

BACKGROUND OF THE INVENTION

Thermoplastic olefin polymers, such as linear polyethylene, polypropylene, and olefin copolymers, such as ethylene propylene copolymer, are conveniently formed in continuous loop-type polymerization reactors and thermoformed to arrive at granules or pellets of the polymers. For example, polypropylene and/or propylene/ethylene copolymers are polymerized in continuous polymerization reactors in which the monomer stream is introduced into a reactor and circulated with an appropriate catalyst to produce the olefin homopolymer or copolymer. The polymer is withdrawn from the catalyst reactor and subjected to appropriate processing steps and then extruded as a thermoplastic mass through an extruder and die mechanism to produce the polymer as a raw material in particulate form, usually as pellets or granules. The polymer particles are ultimately heated and processed in the formation of the desired end products.

Polypropylene and propylene copolymers, as used in various applications involving production of films, fibers, and similar products in the polymers, are thermo-processed and shaped or oriented by one uni-directional or bi-directional stresses. Such polymers are thermoplastic crystalline polymers. Polymers of this nature are subject to degradation due to high temperatures and photochemical action induced by electromagnetic radiation in the visible light range and in the ultraviolet region. In order to retard the degradation of such polymeric objects, the base polymer system, which is molded or extruded to form the desired object, e.g. fiber or film, may be treated with hindered amine light stabilizers, identified by the acronym "HALS," which function to protect the film, fiber, or other object against degradation due to electromagnetic radiation by radiation in the visible light spectrum.

Isotactic polypropylene is conventionally used in the production of fibers in which the polypropylene is heated and then extruded through one or more dies to produce a fiber preform which is processed by a spinning and drawing operation to produce the desired fiber product. The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain. Isotactic polypropylene can be illustrated by the following chemical formula:

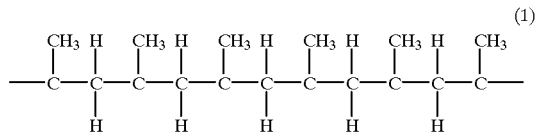

(1)

Stereoregular polymers, such as isotactic and syndiotactic polypropylene, can be characterized in terms of the Fisher projection formula. Using the Fisher projection formula, the stereochemical sequence of isotactic polypropylene, as shown by Formula (2), is described as follows:

(2)

Another way of describing the structure is through the use of NMR. Bovey's NMR nomenclature for an isotactic pentad is ... mmmm ... with each "m" representing a "meso" dyad, or successive methyl groups on the same side of the plane of the polymer chain. As is known in the art, any deviation or inversion in the structure of the chain lowers the degree of isotacticity and crystallinity of the polymer.

In contrast to the isotactic structure, syndiotactic propylene polymers are those in which the methyl groups attached to the tertiary carbon atoms of successive monomeric units in the polymer chain lie on alternate sides of the plane of the polymer. Using the Fisher projection formula, the structure of syndiotactic polypropylene can be shown as follows:

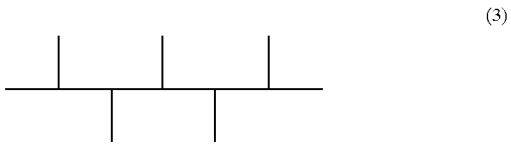

(3)

The corresponding syndiotactic pentad is rrrr with each r representing a racemic diad. Syndiotactic polymers are semi-crystalline and, like the isotactic polymers, are insoluble in xylene. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product. Catalysts that produce syndiotactic polypropylene are disclosed in U.S. Pat. No. 4,892,851. As disclosed there, the syndiospecific metallocene catalysts are characterized as bridged structures in which one Cp group is sterically different from the others. Specifically disclosed in the '851 patent as a syndiospecific metallocene is isopropylidene(cyclopentadienyl- 1-fluorenyl) zirconium dichloride.

In most cases, the preferred polymer configuration will be a predominantly isotactic or syndiotactic polymer with very little atactic polymer. Catalysts that produce isotactic polyolefins can be characterized as falling in two general classes, metallocene catalysts and so-called "conventional" Ziegler-Natta catalysts. The conventional Ziegler-Natta catalysts are stereospecific complexes formed from a transition metal halide and a metal alkyl or hydride. Metallocene catalysts are coordination compounds or cyclopentadienyl groups coordinated with transitional metals through π bonding.

The polymerization catalysts may be characterized as supported catalysts or as unsupported catalysts, sometimes referred to as homogeneous catalysts. Metallocene catalysts are often employed as unsupported or homogeneous catalysts, although, as described below, they also may be employed in supported catalyst components. Traditional supported catalysts are the so-called "conventional" Ziegler-Natta catalysts, such as titanium tetrachloride supported on an active magnesium dichloride, as disclosed, for example, in U.S. Pat. Nos. 4,298,718 and 4,544,717, both to Myer et al. A supported catalyst component, as disclosed in the Myer '718 patent, includes titanium tetrachloride supported on an "active" anhydrous magnesium dihalide, such as magnesium dichloride or magnesium dibromide. The supported catalyst component in Myer '718 is employed in conjunction with a co-catalyst such and an alkylaluminum compound, for example, triethylaluminum (TEAL). The Myer '717 patent discloses a similar compound which may also incorporate an electron donor compound which may take the form of various amines, phosphenes, esters, aldehydes, and alcohols.

Stereospecific metallocenes are disclosed in U.S. Pat. Nos. 4,794,096 and 4,975,403. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes which may be characterized by the following formula:

$$R''(C_5(R')_4)_2 \, HfQp \qquad (4)$$

In Formula (4), $(C_5(R')_4)$ is a cyclopentadienyl or substituted cyclopentadienyl group, R' is independently hydrogen or a hydrocarbyl radical having 1–20 carbon atoms, and R" is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

Metallocene catalysts, such as those described above, can be used either as so-called "neutral metallocenes" in which case an alumoxane, such as methylalumoxane, is used as a co-catalyst, or they can be employed as so-called "cationic metallocenes" which incorporate a stable non-coordinating anion and normally do not require the use of an alumoxane. For example, syndiospecific cationic metallocenes are disclosed in U.S. Pat. No. 5,243,002 to Razavi. As disclosed there, the metallocene cation is characterized by the cationic metallocene ligand having sterically dissimilar ring structures which are joined to a positively-charged coordinating transition metal atom. The metallocene cation is associated with a stable non-coordinating counter-anion. Similar relationships can be established for isospecific metallocenes.

While metallocene catalysts are generally proposed for use as homogeneous catalysts, it is also known in the art to provide supported metallocene catalysts. As disclosed in U.S. Pat. Nos. 4,701,432 and 4,808,561, both to Welborn, a metallocene catalyst component may be employed in the form of a supported catalyst. As described in the Welborn '432 patent, the support may be any support such as talc, an inorganic oxide, or a resinous support material such as a polyolefin. Specific inorganic oxides include silica and alumina, used alone or in combination with other inorganic oxides such as magnesia, zirconia and the like. Non-metallocene transition metal compounds, such as titanium tetrachloride, are also incorporated into the supported catalyst component. The Welborn '561 patent discloses a heterogeneous catalyst which is formed by the reaction of a metallocene and an alumoxane in combination with the support material. A catalyst system embodying both a homogeneous metallocene component and a heterogeneous component, which may be a "conventional" supported Ziegler-Natta catalyst, e.g. a supported titanium tetrachloride, is disclosed in U.S. Pat. No. 5,242,876 to Shamshoum et al. Various other catalyst systems involving supported metallocene catalysts are disclosed in U.S. Pat. Nos. 5,308,811 to Suga et al and 5,444,134 to Matsumoto.

The polymers normally employed in the preparation of drawn polypropylene fibers are normally prepared through the use of conventional Ziegler-Natta catalysts of the type disclosed, for example, in the aforementioned patents to Myer et al. U.S. Pat. Nos. 4,560,734 to Fujishita and 5,318,734 to Kozulla disclose the formation of fibers by heating, extruding, melt spinning, and drawing from polypropylene produced by titanium tetrachloride-based isotactic polypropylene. Particularly as disclosed in the patent to Kozulla, a preferred isotactic polypropylene for use in forming such fibers has a relatively broad molecular weight distribution (abbreviated MWD), as determined by the ratio of the weight average molecular weight ($M_w$) to the number average molecular ($M_n$) of about 5.5 or above. As disclosed in the Kozulla patent, the preferred molecular weight distribution, $M_w/M_n$, is said to be at least 7.

It is also known to produce polypropylene-based fibers from syndiotactic polypropylene. Thus, as disclosed in U.S. Pat. No. 5,272,003 to Peacock, syndiotactic polypropylene, such as that produced by syndiospecific metallocenes of the type disclosed in the aforementioned U.S. Pat. No. 4,892,851, can be used to produce polypropylene fibers using various techniques disclosed therein and identified as melt spinning, solution spinning, flat film spinning, blown film, and melt blowing or spunbond procedures. As disclosed in Peacock, the syndiotactic polypropylene, as characterized by polymer configuration, comprises racemic diads connected predominantly by meso triads. As noted in Peacock, the syndiotactic polypropylene fibers may be in the form of continuous filament yarn, monofilaments, staple fiber, tow, or top. Syndiotactic fibers, as thus produced, are characterized as having substantially greater retraction value than fibers formed of isotactic polypropylene. This enhanced elasticity is said to form an advantage of the syndiotactic polypropylene fibers over isotactic polypropylene fibers for use in garments, carpets, tie downs, tow ropes, and the like.

In employing polypropylene and other polyolefin polymers, there are large numbers of additives which are sometimes used. As noted previously, hindered amine light stabilizers can be used. Other stabilizers which can be employed to stabilize the polymer product and the products into which the polymers are incorporated include various additives which function to stabilize the polymer products, not only against light or UV degeneration but also against thermal or oxidative degeneration or actinic degradation. Thus, as disclosed in U.S. Pat. No. 4,325,863 to Hinsken et al, various benzofuranone or indolinone compounds can be used as stabilizing agents for such polymers as polypropylene, polyethylene, propylene ethylene co-polymers, and various other polymeric materials. As disclosed in Hinsken et al, a wide range of benzofuranones, which may be substituted or unsubstituted to include both polycyclic and monocyclic lactones, can be employed. Preferably, these are incorporated in extruders in which the stabilizing compounds are mixed with granules of such polyethylene or polypropylene granules and then extruded into the desired product. U.S. Pat. No. 5,175,312 to Dubs et al discloses the use of various phenol benzofuran-2-ones as stabilizers in the polymeric materials which are formed into films, fibers, tapes, and the like. The 3-phenol benzofuranones of Dubs et al are generally characterized to include 3-phenol benzofuranones with substituent groups at the 7 position of relatively high molecular weight, e.g. alkyl, containing 14 or more carbon atoms, with substituent groups at either or both of the 4 and 5 positions of alkyl groups or various cyclo-alkyl substituents of somewhat lower molecular weights. The phenol substituent at the 3 position can be substituted with $C_1$–$C_4$ alkoxy, halide, or $C_1$–$C_8$ alkyl groups.

SUMMARY OF THE INVENTION

In accordance with the present invention there is provided a process for the production and treatment of a stereoregular polypropylene, such as isotactic polypropylene. In carrying out the invention, a polymerization reactor is operated under conditions to react propylene supplied to the reactor to produce a stereoregular propylene polymer fluff. A product stream containing the fluff and unreacted propylene is withdrawn from the reactor and at least a portion of the unreacted propylene is separated from the product stream. The propylene polymer fluff is heated to a temperature of at least 150° C. which is sufficient to melt the propylene polymer. An additive is incorporated into the propylene polymer. The additive is a lactone characterized by the formula:

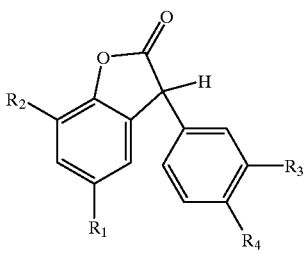

(5)

wherein $R_1$ and $R_2$ are each independently an alkyl group containing from 2 to 5 carbon atoms and $R_3$ and $R_4$ are each independently an alkyl group containing 1 to 2 carbon atoms. After the heating and incorporation of the lactone, the heated polymer fluff containing the lactone is extruded to produce particles of the propylene polymer.

Preferably, the lactone characterized by Formula 1 is one in which the substituent groups $R_1$ and $R_2$ are the same. Further, it is preferred that the substitutent groups $R_3$ and $R_4$ are of a lower molecular weight, that is, containing few carbon atoms, than the substituent groups $R_1$ and $R_2$. Preferably, the substituent groups $R_1$ and $R_2$ are each tertiary butyl groups. A preferred lactone for use in carrying out the invention is 5,7 di-t-butyl-3-(2,3 di-methylphenyl)-3H-benzofuran-2-one, which is present in a concentration within the range of about 0.005 to 0.02 wt. %.

In a further aspect of the invention, there is provided a process for the production of polypropylene fibers by the use of particles of a polymer comprising isotactic polypropylene and a lactone as described above and which is incorporated into the polymer prior to heating and extrusion of the polymer to produce the polymer particles. The polymer particles containing the lactone are heated to a molten state and then extruded to form a fiber preform. The fiber preform is subject to spinning and drawing at differential spinning and drawing speeds to provide a draw ratio sufficient to form a continuous polypropylene fiber.

DETAILED DESCRIPTION OF THE INVENTION

Figure 1:
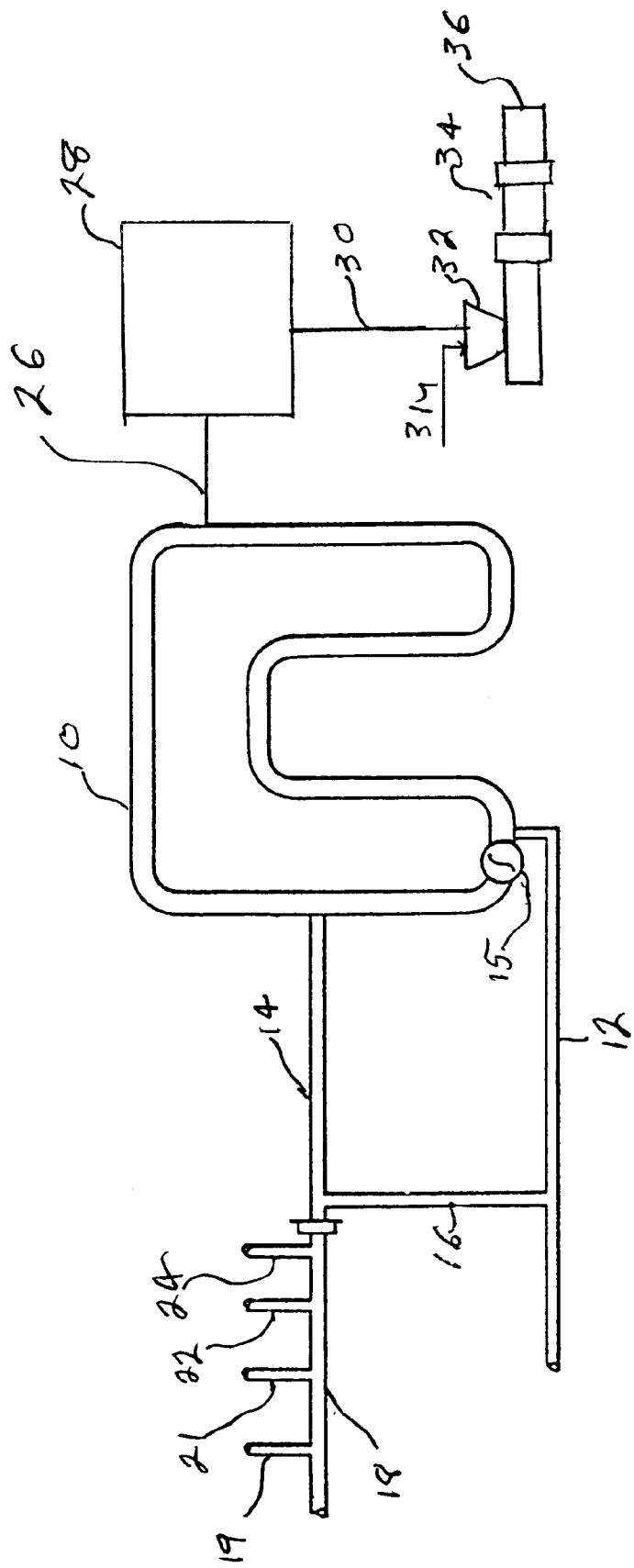
FIG. 1 is a schematic illustration of a process for the polymerization of polypropylene in which the present invention is implemented.

The present invention involves the use of a particular class of polyalkyl-substituted cyclic lactones which are incorporated in the formation of a propylene polymer product to provide a product which is especially suitable for use in the formation of fiber products. The invention will be described with reference to a loop-type reactor used in the production of stereoregular polypropylene, specifically isotactic polypropylene, although it will be recognized that the invention may be carried out with respect to syndiotactic polypropylene or other propylene polymers or copolymers which may incorporate other olefin polymers such as polyethylene. Referring to FIG. 1, there is illustrated a loop-type polymerization reactor 10 which is supplied with propylene monomer through an input line 12 and a catalyst system through an input line 14. The continuous loop-type reactor is, as will be understood by those skilled in the art, equipped with an impeller 15 which functions to circulate the polymerization reaction mass continuously through the loop-type reactor under controlled temperature and pressure conditions. The polymerization reactor may be operated under any suitable conditions. Liquified propylene preferably is used as the carrier medium in the course of the polymerization reaction within reactor 10. Alternatively, an inert solvent such as hexane can be used.

A catalyst system, which may take the form of a conventional Ziegler-Natta catalyst system or a metallocene-based catalyst system of the types described previously, is incorporated into the polymerization reactor through catalyst feedline 14 in which the catalyst components are prepolymerized with a small amount of propylene monomer which is supplied to line 14 through line 16 as disclosed in U.S. Pat. No. 4,767,735 to Ewen et al before being introduced into the catalyst system. For example, the catalyst may take the form of supported titanium tetrachloride supported on an activated magnesium dichloride or dibromide employed in conjunction with a co-catalyst, such as triethylaluminum, and an electron donor, such as diphenyldimethoxysilane (DPMS), as disclosed in the aforementioned patent to Ewen et al, or methylcyclohexyl-dimethoxysilane, as diclosed in U.S. Pat. No. 4,927,797 to Ewen. In the prepolymerization injection system, a carrier solvent, such as hexane or heptane, is supplied to a mixing line 18 via a supply line 19. The co-catalyst is supplied through line 21 and the electron donor through line 22 and then mixed with the supported titanium tetrachloride catalyst (or another Ziegler-Natta catalyst) introduced through line 24 and then prepolymerized and introduced into the reactor 10 via line 14. The catalyst may be supplied either continuously or intermittently to the carrier stream for inclusion into the reactor. Preferably, the catalyst is prepolymerized in a tubular reactor operated under a relatively short residence time as disclosed in Ewen et al. For a further description of suitable prepolymerization times and procedures, reference is made to the aforementioned U.S. Pat. No. 4,767,735 to Ewen et al, the entire disclosure of which is incorporated herein by reference.

A suitable Ziegler-Natta catalyst can take the form of a heterogeneous titanium tetrachloride supported on an activated support. Metallocene catalyst systems which may be either homogeneous or heterogeneous can also be employed in carrying out the present invention. In the production of isotactic polypropylene, bridged metallocene catalyst systems of the type disclosed in the aforementioned U.S. Pat. Nos. 4,794,096 and 4,975,403 may be employed. Similarly, the catalyst system used in producing the isotactic polypropylene could take the form of supported metallocene catalyst as disclosed in the aforementioned U.S. Pat. Nos. 4,701,432 and 4,808,561. Hybrid catalyst systems employing both metallocene-based catalysts and supported titanium tetrachloride-based catalysts, such as disclosed in the aforementioned U.S. Pat. No. 5,248,876, may also be employed. In addition, where it is desired to form a syndiotactic polypropylene, catalyst systems such as disclosed in the aforementioned U.S. Pat. Nos. 4,892,851 and 5,243,002 may be introduced into the loop-type reactor.

At the product side of the reactor, the propylene polymer is withdrawn via line 26. Typically, a deactivator is incorporated into the product stream in order to terminate the polymerization reaction in the solvent stream containing the polypropylene. The product is supplied to a concentration and recovery system 28 in which polypropylene fluff is extracted through line 30. Propylene is recovered through a suitable purification and recovery system (not shown). The product stream containing the polypropylene fluff, which is now free of gaseous propylene, is withdrawn from the recovery system via line 30.

The polypropylene fluff is heated to a molten state and supplied to the input hopper 32 of an extruder-die system 34. In the extruder-die system, the polymer is extruded and then cut into appropriate particles. Typically, a polypropylene product may be extruded and die cut into pellets of about ⅛" in diameter and about ¼" long which are discharged from the product end 36 of the extruder-die system 34. These products may then be heated and extruded in various applications, such as in the production of films or fibers as described in greater detail below.

The propylene polymer particles thus produced can be used in fiber spinning procedures either immediately or after storage for periods ranging from days to months. In general, the fiber-forming procedure involves heating the polymer particles to a molten state and extruding the molten polymer to provide a fiber preform. The fiber preform is then subject to spinning and drawing at differential spinning and drawing speeds to provide a draw ratio sufficient to form a continuous polypropylene polymer.

From the foregoing description, it will be recognized that much of the processing of polypropylene or other thermoplastic polymers can be carried out at elevated temperatures, ranging as high as 320° C. These high processing temperatures can induce deterioration of the polymer product. In the case of polypropylene, at these high temperatures, the polymer can undergo thermal degradation resulting in undesirable properties, such as a decrease in molecular weight and melt viscosity and an increase in the melt flow index.

In order to retard such thermal degradation of the polymer product, one solution involves the introduction of a thermal stabilizer into the polypropylene product stream. Conventionally-used stabilizers can take the form of phenolic anti-oxidants and various processing stabilizers such as phosphites and phosphonites. Hindered amine light stabilizers (HALS) can also be introduced in the process in lieu of or in addition to other stabilizers. Such hindered amine light stabilizers may be of any suitable type such as described in U.S. Pat. Nos. 4,929,653 to Kletecka et al and 5,354,795 to Ueno et al. The HALS components may be described as bridged heterocyclic amines having at least one, and in most cases a plurality, of heterocyclic amino groups.

A suitable spinning procedure for use in carrying out the invention is the Fourne melt spinning procedure. In this procedure polypropylene is heated and extruded at a suitable temperature, about 180°–280° C. and then passed through a metering pump to a spinnerette. The fiber preforms thus formed are cooled in air then applied through one or more godets to a spinning roller which is operated at a desired spinning rate of about 500–1500 meters per minute. The thus-formed filaments are drawn off the spin role to the drawing roller which is operated at a substantially-enhanced speed in order to produce the drawn fiber. The draw speed normally will range from about 500–4,000 meters per minute and is operated relative to the spinning godet to provide the desired draw ratio normally within the range of 2:1 to 5:1. For a further description of suitable fiber-spinning procedures for use in the present invention, reference is made to the aforementioned U.S. Pat. No. 5,272,003 and U.S. Pat. No. 5,318,734, the entire disclosures of which are incorporated herein by reference.

Figure 2:
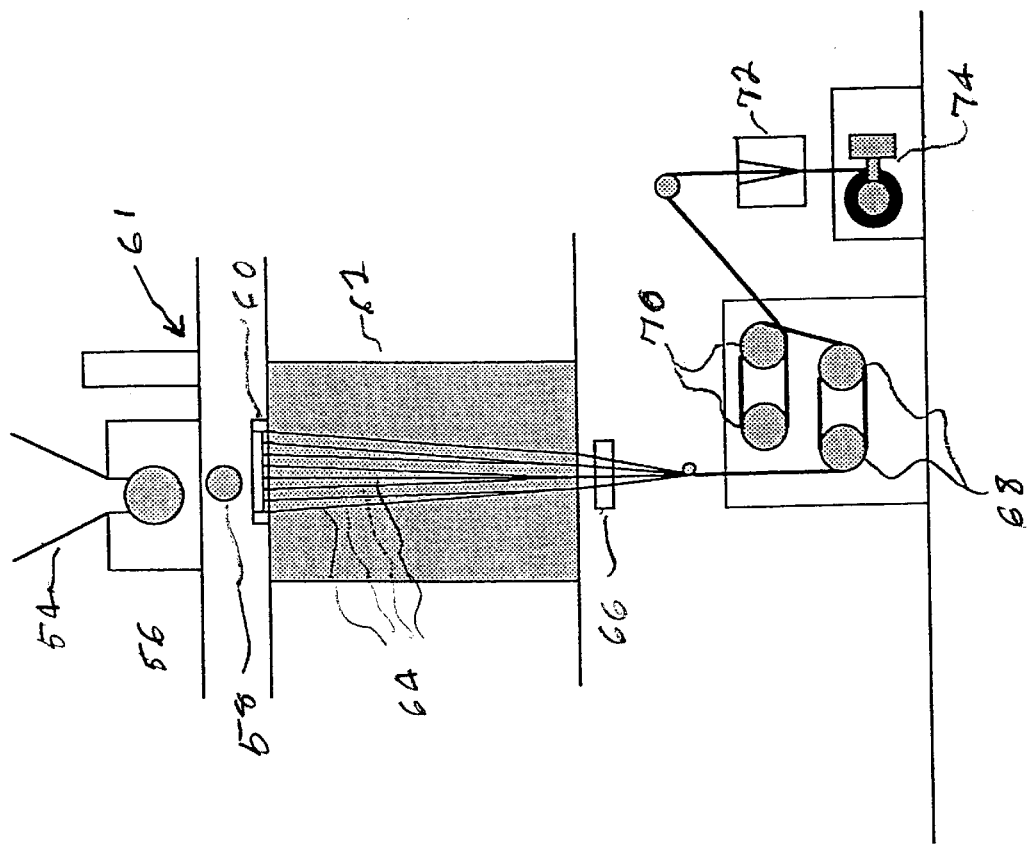
FIG. 2 is a schematic illustration of a fiber drawing process which can be used to implement the present invention.

A Fourne fiber spinning machine is illustrated in FIG. 2. As shown in FIG. 2, the polypropylene particles are passed from a hopper 54 through a heat exchanger 56 where the polymer pellets are heated to a suitable temperature for extrusion, about 180°–280° C. for the metallocene-based polypropylene used here, and then through a metering pump 58 (also called a spin pump) to a spin extruder 60 (also called a spin pack). The portion of the machine from hopper 54 through the spin pack 60 is collectively referred to as an extruder 61. The fiber preforms 64 thus formed are cooled in air in quench column 62 then passed through a spin finisher 66. The collected fibers are then applied through one or more godets to a spinning roll, illustrated in this embodiment as rollers 68 (also collectively referred to as Godet 1. These rollers are operated at a desired spinning rate (referred to as the G1 speed), about 100–1500 meters as described above. The thus-formed filaments are drawn off the spin roller to the drawing rollers 70 (also collectively referred to as Godet 2) which are operated at a substantially-enhanced speed (the draw speed or G2 speed) in order to produce the drawn fiber. The draw speed normally will range from about 500–4,000 meters per minute and is operated relative to the spinning godet to provide the desired draw ratio normally within the range of 1.5:1 to 6:1. The spun and drawn fiber is passed through a texturizer 72 and then wound up by a winder 74. While the illustrated embodiment and description encompasses the spinning and drawing of a fully oriented yarn, the same equipment may also be used to make a partially oriented yarn. In that instance the drawing step is left out, leaving only the act of spinning the yarn out of the extruder. This step is often accomplished by connecting winder 74 immediately following spin finisher 76 and involves bypassing drawing rollers 70. The force of winding/spinning the yarn off of the extruder does result in some stress and elongation, partially orienting the yarn, but does not provide the full benefits of a complete drawing process. For a further description of suitable fiber-spinning procedures for use in the present invention, reference is made to the aforementioned U.S. Pat. No. 5,272,003 and U.S. Pat. No. 5,318,734, the entire disclosures of which are incorporated herein by reference.

As disclosed in the aforementioned patent to Hinsken et al, various stabilizing additives such as benzofuranones and indolinones may be incorporated into the polymeric material as stabilizers before polymerization, during polymerization, or after polymerization. When incorporating such stabilizers after polymerization, the preferred practice is to mix the stabilizers with the polypropylene or other granules during the course of the extrusion procedure in which they are used to form the desired products, such as films, foils, and the like. The stabilizers, such as disclosed in the aforementioned patent to Dubs et al directed to the use of 3-phenylbenzofuranones, can be applied by spraying the stabilizing compounds onto the particulate polymer to be stabilized, and then the stabilized materials are again used to form films, fibers, tapes, and the like.

The present invention employs the use of a particular class of phenolic lactones and proceeds in a manner contrary to the teachings of the prior art by incorporating the polylactones into the polypropylene fluff subsequent to polymerization but prior to forming the propylene polymer into the granular or powder form. By using this procedure, the propylene polymer granules can be used immediately in the fiber-forming process, or they can be stored for long periods of time while still retaining their effectiveness in enhancing the physical characteristics of the fibers as well as their processability characteristics, principally in controlling melt flow degradation.

The lactone-type stabilizers employed in the present invention, while of the general class of benzofuranones conventionally used as stabilizers, are different not only in their mode of application but also in the configuration of the substituent groups not only on the benzofuranone ligand structure but also on a phenyl substituent at the 3 position of the benzofuran structure. Specifically, the lactone employed in the present invention can be characterized as 5,7 dialkyl-3-(2,3 dialkyl phenyl)-3H-benzofuran-2-one, in which the 5,7 and 2,3 substituents are all of relatively low molecular weight with the phenyl alkyl substituents, each containing 1 or 2 carbon atoms, and the 5,7 alkyl substituents containing from 2 to 5 carbon atoms. The substituted lactones employed in the present invention can be characterized by the following structural formula wherein $R_1$ and $R_2$ and are each independently an alkyl group containing from 2 to 5 carbon atoms and $R_3$ and $R_4$ are each independently an alkyl group containing 1 or 2 carbon atoms. The stabilizing lactone is incorporated into the propylene polymer subsequent to polymerization but prior to formation of the propylene polymer granules or particles. More, particularly, and with reference to FIG. 1, the lactone additive is incorporated into the polymer fluff via additive line 31 prior to applying the heated polymer fluff to the extruder in the pelletizing process. Specifically, the lactone stabilizing agent can be incorporated into the molten polymer fluff as it exits heater 42 into the extruder hopper 45. Other additives may also be incorporated into the polymer fluff at this stage.

The lactone stabilizing agent of the present invention is incorporated into the molten stereospecific polypropylene, preferably in an amount within the range of 0.005 wt. % to 0.03 wt. %. While greater amounts can be employed, as indicated by the experimental work described below, amounts in excess of about 0.03 wt. % cause an increase in extrusion pressure. Preferably, the lactone stabilizer of the present invention is employed amount within the range of about 0.005 to 0.02 wt. %.

Returning to Formula (5), a preferred lactone stabilizer is one in which the R groups, $R_1$ and $R_2$, are the same and further, one in which the substituent groups $R_3$ and $R_4$ contain fewer carbon atoms than the substituent groups $R_1$ and $R_2$. Also the substituent groups, $R_3$ and $R_4$, and preferably the same. In a particularly preferred embodiment of the invention, the stabilizing lactone is one in which substituent groups $R_1$ and $R_2$ are tertiary butyl groups. Thus, an especially preferred stabilizing agent is the benzofuranone, 5,7-di-t-butyl-3-(2,3 di-methylphenyl) phenyl)-3H-benzofuran-2-one. This compound can be characterized by the following structural formula:

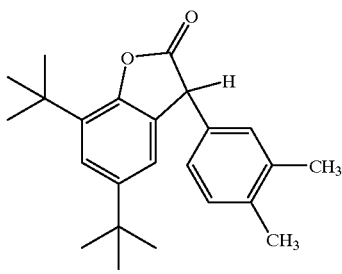

(6)

In experimental work carried out respecting the present invention, the preferred lactone, 5,7 di-t-butyl-3-(2,3 di-methylphenyl)-3H-benzofuran-2-one, was added to polypropylene fluff in various levels and the fluff then evaluated for regrind, pressure rise, gas fading, and fiber properties. In general, the use of the additive substantially produced the melt flow stability of the polypropylene and provided an improvement in the "hand" properties of the fibers. As will be recognized by those skilled in the art, "hand" is a somewhat subjective measurement of the smoothness of the fiber when incorporated into carpeting and other applications. The gas fade and pressure rise tendencies of the polymer products incorporating the lactone additive were, in general, not adversely affected so long as the additive was added within the preferred concentration range. The lactone employed in the experimental work was a commercially-available product available from Ciba-Geigy Corp. under the designation HP 136. It is available as a powder having a melting point range of 97–130° C. and a molecular weight of 351. The product exhibits a solubility on a weight percent basis of about 1% in methanol, 2.5% in ethanol, and 15.3% in acetone.

In the experimental work the polypropylene was tested under the experimental conditions without the lactone additive and with the additive added in amounts of 0.005 wt. %, 0.02 wt. %, and 0.035 wt. %. The formulations tested were polypropylene fluff produced by polymerization of propylene in the presence of a supported Ziegler-Natta catalyst (titanium tetrachloride supported on a magnesium-based support) which were identical in additive contents other than the variable lactone concentration. The polypropylene fluff without the addition of the lactone had a melt flow index of 16.8. Stability of the melt flow index was evaluated by pelletizing strands and re-extruding the pelletized strands for two consecutive passes. Pressure rise during extrusion was studied by continuous extrusion through a narrow slit-tape die for eight hours at a temperature of 280° C. The fibers were spun at a melt temperature of 230° C. In this experimental work two trilobal spinnerettes containing 60 holes each (0.3–0.7 mm) were used to spin the fibers from the melt product and the resulting filaments were quenched at a pressure of 1.5 mBAR with cool air at a temperature at 10° C. The Godet temperatures were maintained at 116° C. for the first Godet and 60° C. for the second Godet. The second Godet was operated at a constant speed of 1,000 meters per minute, and the speed of the first Godet was changed in order to vary the draw ratio. The draw ratio was varied at increments of 0.5 starting at a low draw ratio of 1.5 and incrementing upward until maximum drawability was accomplished keeping the denier constant at about 2,400.

The results of physical tests on the propylene pellets containing the lactone 5,7 di-t-butyl-3-(2,3 di-methylphenyl)-3H-benzofuran-2-one are shown in Tables 1, 2 and 3. In each of Tables 1, 2, and 3 the samples are identified by sample numbers ranging from 1 through 4. For Sample 1 there was no lactone; for Samples 2, 3, and 4, the lactone was present in concentrations of 0.005 wt. %, 0.02 wt. %, and 0.035 wt. %, respectively.

TABLE 1

| Sample # Melt Flow | 1 | 2 | 3 | 4 |
| --- | --- | --- | --- | --- |
| Pass 0 | 15.8 | 16.1 | 16.0 | 16.4 |
| Pass 1 | 21.3 | 21.8 | 20.0 | 20.0 |
| Pass 2 | 28.0 | 35.3 | 23.3 | 21.0 |

TABLE 2

| Property/Sample # | 1 | 2 | 3 | 4 |
| --- | --- | --- | --- | --- |
| % Elongation @ max | 228 | 232 | 227 | 226 |
| Tenacity @ max | 3.0 | 3.0 | 3.0 | 2.9 |
| % Shrinkage | 7.3 | 8.4 | 8.3 | 8.6 |
| Tenacity @ 5%/E (g/den) | 0.70 | 0.73 | 0.73 | 0.72 |
| Modulus @ 5% E (g/den) | 9.0 | 8.1 | 8.3 | 8.1 |

TABLE 3

| Property/Sample # | 1 | 3 | 4 |
| --- | --- | --- | --- |
| Pressure Rise (N/cm²/min) | 0.90 | 0.83 | 2.69 |
| Extrusion Rate (Kg/hr) | 4.4 | 4.5 | 4.4 |
| Pressure Rise (N/cm²/Kg) | 12.3 | 11.1 | 37.0 |
| Pressure Rise (N/cm²/hr) | 53 | 50 | 161 |
| Pressure Rise Temp (° C.) | 545 | 540 | 535 |

As shown in Table 1, the original melt flow index for each of the samples range from a low of 15.8 at zero additive concentration to a maximum of 16.4 at an additive concentration of 0.035 wt. %. For the original sample, melt flow degradation progressively increased with each pass, whereas for Samples 3 and 4 it generally stabilized after an initial modest increase.

Table 2 shows the results of the physical properties enumerated in the left-hand column as a function of the additive concentration. In general, the progressively-increasing additive 0.035 wt. %. For the original sample, melt flow degradation progressively increased with each pass, whereas for Samples 3 and 4 it generally stabilized after an initial modest increase.

Table 2 shows the results of the physical properties enumerated in the left-hand column as a function of the additive concentration. In general, the progressively-increasing additive concentration had little effect on the physical properties, although shrinkage was slightly higher beginning with the threshold concentration of 0.005 wt. %.

Results of the pressure rise are reported in Table 3 for the polypropylene free of lactone (Sample 1) and for the pellets containing 0.02 and 0.35% lactone, in Samples 3 and 4, respectively. As can be seen from an examination of the data in Table 3, by increasing the lactone concentration from 0.02 to 0.035, the extrusion pressure rose dramatically. However, an additive concentration in the amount of 0.02 wt. % actually decreased the extrusion pressure slightly under comparable conditions of extrusion rate and temperature. As a practical matter, therefore, it will be preferred to limit the lactone concentration to an amount of about 0.02% or less in order to avoid excessive extrusion pressure.

Having described specific embodiments of the present invention, it will be understood that modifications thereof may be suggested to those skilled in the art, and it is intended to cover all such modifications as fall within the scope of the appended claims.

What is claimed:

1. In the production and treatment of a stereoregular propylene polymer, the method comprising:

a. operating a polymerization reactor for the reaction of propylene supplied to said reactor to produce a stereoregular propylene polymer fluff;

b. withdrawing a product stream containing unreacted propylene and said propylene polymer fluff from said polymerization reactor;

c. separation at least a portion of said unreacted propylene from said product stream;

d. heating said propylene polymer fluff to a temperature sufficient to melt said propylene polymer;

e. incorporating into said propylene polymer a lactone characterized by the formula:

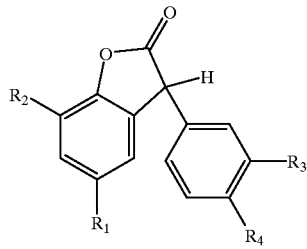

wherein $R_1$ and $R_2$ are each independently an alkyl group containing from 2 to 5 carbon atoms and $R_3$ and $R_4$ are each independently an alkyl group containing 1 or 2 carbon atoms; and f. subsequent to said heating and incorporation of said lactone, extruding said heated polymer fluff containing said lactone to produce particles of said propylene polymer.

2. The method of claim 1 further heating said polymer particles to a molten state and extruding said molten polymer to form a fiber preform and thereafter spinning and drawing said fiber preform at differential spinning and drawing speeds to provide a draw ratio sufficient to form a continuous polypropylene fiber.

3. The method of claim 1 wherein these substituent groups $R_1$ and $R_2$ are the same.

4. The method of claim 3 wherein each of the substituent groups $R_3$ and $R_4$ contain fewer carbon atoms than each of the substituent groups $R_1$ and $R_2$.

5. The process of claim 4 wherein $R_1$ and $R_2$ are each tertiary butyl groups.

6. The method of claim 1 where said stereoregular propylene polymer comprises isotactic polypropylene.

7. The method of claim 6 wherein said lactone comprises 5,7-di-t-butyl-3-(2,3 di-methylphenyl)-3H-benzofuran-2-one.

8. The method of claim 7 wherein said lactone is incorporated into said polymer fluff in an amount within the range of about 0.005–0.02 wt. % based upon said polypropylene polymer.

9. In the production of polypropylene fibers, the process comprising:

a. providing particles of a polymer comprising isotactic polypropylene containing a lactone characterized by the formula

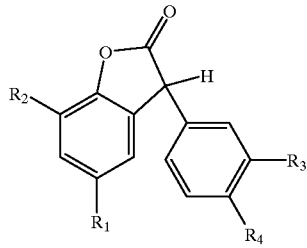

wherein $R_1$ and $R_2$ are each independently an alkyl group containing from 2 to 5 carbon atoms and $R_3$ and $R_4$ are each independently an alkyl group containing 1–2 carbon atoms, said lactone being incorporated into said polymer prior to heating and extrusion of said polymer to produce polymer particles; and b. heating said polymer particles to a molten state and extruding said molten polymer to form a fiber preform and thereafter spinning and drawing said fiber preform at differential spinning and drawing speeds to provide a draw ratio sufficient to form a continuous polypropylene fiber.

10. The method of claim 9 wherein these substituent groups $R_1$ and $R_2$ are the same.

11. The method of claim 9 wherein each of the substituent groups $R_3$ and $R_4$ contain fewer carbon atoms than each of the substituent groups $R_1$ and $R_2$.

12. The process of claim 9 wherein $R_1$ and $R_2$ are each tertiary butyl groups.

13. The method of claim 9 wherein said lactone comprises 5,7-di-t-butyl-3-(2,3 di-methylphenyl)-3H-benzofuran-2-one.

14. The method of claim 13 wherein said lactone is incorporated into said polymer fluff in an amount within the range of about 0.005–0.02 wt. % based upon said polypropylene polymer.

* * * * *